(12) United States Patent  
Gern et al.

(10) Patent No.: US 8,688,522 B2
(45) Date of Patent: Apr. 1, 2014

(54) SYSTEM AND METHOD FOR DYNAMIC ONLINE ADVERTISEMENT CREATION AND MANAGEMENT

(75) Inventors: Judith Ann Gern, Charlestown, MA (US); Ming-Lun Tung, Boston, MA (US); Wennt Wang, Boston, MA (US)

(73) Assignee: MediaMath, Inc., New York, NY (US)

( * ) Notice: Subject to any disclaimer, the term of this patent is extended or adjusted under 35 U.S.C. 154(b) by 1141 days.

(21) Appl. No.: 11/896,806

(22) Filed: Sep. 6, 2007

(65) Prior Publication Data

US 2008/0059312 A1    Mar. 6, 2008

Related U.S. Application Data

(60) Provisional application No. 60/824,650, filed on Sep. 6, 2006.

(51) Int. Cl.
*G06Q 30/00* (2012.01)
(52) U.S. Cl.
USPC .................................... 705/14.72; 705/14.73
(58) Field of Classification Search
None
See application file for complete search history.

(56) References Cited

U.S. PATENT DOCUMENTS

| | | |
|---|---|---|
| 5,983,227 A | 11/1999 | Nazem et al. |
| 6,974,078 B1 | 12/2005 | Simon |
| 2002/0103698 A1 | 8/2002 | Cantrell |
| 2003/0023489 A1 | 1/2003 | McGuire et al. |
| 2004/0054589 A1 | 3/2004 | Nicholas et al. |
| 2004/0083133 A1 | 4/2004 | Nicholas et al. |
| 2004/0123247 A1 | 6/2004 | Wachen et al. |
| 2005/0144073 A1 | 6/2005 | Morrisroe et al. |
| 2005/0159921 A1 | 7/2005 | Louviere et al. |
| 2005/0171843 A1 | 8/2005 | Brazell et al. |
| 2005/0216339 A1 | 9/2005 | Brazell et al. |
| 2005/0251444 A1 | 11/2005 | Varian et al. |
| 2006/0026067 A1 | 2/2006 | Nicholas et al. |
| 2007/0033105 A1 | 2/2007 | Collins et al. |
| 2007/0061195 A1 | 3/2007 | Liu et al. |
| 2007/0118796 A1 | 5/2007 | Nazem et al. |
| 2007/0156524 A1* | 7/2007 | Grouf et al. ..................... 705/14 |
| 2007/0157245 A1 | 7/2007 | Collins |
| 2008/0004954 A1* | 1/2008 | Horvitz .......................... 705/14 |

OTHER PUBLICATIONS

"Yahoo Smart Ads Demo Page" printed Sep. 6, 2007.
"Yahoo!'s New "SmartAds" Meld Brand and Direct Response Advertising" printed Sep. 6, 2007.
"Online Customized Ads Move a Step Closer" printed Sep. 6, 2007.

* cited by examiner

*Primary Examiner* — Matthew T Sittner
(74) *Attorney, Agent, or Firm* — Foley & Lardner LLP; Christopher J. McKenna (57) ABSTRACT

A method and system may in response to a request for advertisement components stored at a server, select a subset of advertisement components, and transmit the advertisement components to a client. The client may, for example insert the components into an advertisement in order to, for example, display an advertisement that is custom made for the particular client, or includes a random selection of components, or is an advertisement with components assembled for a different reason.

14 Claims, 4 Drawing Sheets

SYSTEM AND METHOD FOR DYNAMIC ONLINE ADVERTISEMENT CREATION AND MANAGEMENT

RELATED APPLICATION DATA

The present application claims benefit from prior U.S. provisional application Ser. No. 60/824,650, filed on Sep. 6, 2006, entitled "Dynamically Generated Banner Ads and Landing Pages", incorporated herein by reference.

FIELD OF THE INVENTION

The present invention relates to providing messages such as advertisements with variable sets of components, and to monitoring, testing, and recording the results of such delivery.

BACKGROUND OF THE INVENTION

Advertisements or other messages shown on the Internet, commonly but not exclusively "banner ads", are typically created by an advertiser and provided to an advertiser server ("ad server") as a whole unit. The advertiser server is typically a physically and commercially separate entity which cooperates with another typically distinct party, an on-line publisher or web-site operator, such as a search engine, newspaper, or web log ("blog") to place advertisements in the web-site operated by the distinct party, to be displayed to a viewer. In such systems, the advertiser creating and providing the advertisement does not have the ability to easily alter the advertisement once provided to the advertiser server, or to dynamically alter the advertisement, or to obtain feedback based on a large number of different advertisements.

SUMMARY

A method and system may in response to a request for advertisement components stored at a server, select a subset of advertisement components, and transmit the advertisement components to a client. The client may, for example insert the components into an advertisement in order to, for example, display an advertisement that is custom made for the particular client, or includes a random selection of components, or is an advertisement with components assembled for a different reason.

In one embodiment, a method or system may store at a first server a plurality of advertisement components or other variables or components, receive a client a request for components, based on the request, select at the server among the components a subset of components, and transmit the components to the client for assembly into an advertisement. On a viewer indication, the viewer may be redirected from the advertisement to a web page such as a landing page, where the client is the computer of a viewer. The server may receive a request for advertisement components from the landing page, and at the server, advertisement components may be served to the landing page. The client may be the computer of a viewer. The advertisement components may be assembled into an advertisement by the computer of a viewer of the advertisement. The selecting may be performed according to a set of rules. The selecting may be performed according to a set of rules, the rules accepting as input information unrelated to a viewer. The server may receive from an advertiser a request to change an advertisement component. The advertisement may include sections, and for each section a set or plurality of components may be selected to comprise the section. The second server may provide the advertisement to an advertisement viewer.

In one embodiment, a method or system may create at a server a set or plurality of advertisements or other messages, each advertisement including a combination advertisement components or variables, where creating an advertisement may include an advertisement at a viewer terminal remote from the server requesting components from a server. The server may present each advertisement at a viewer terminal to one of a set or plurality of advertisement viewers, and record the success of each of the advertisements.

The server may determine a set of most successful combinations of components and, after a test period, upon a request for components from an advertisement, serve one of the set of most successful combinations to for example an advertisement. The server may generate a plurality of sets of advertisement components, each set of components creating a different advertisement when assembled in an advertisement. The server may create an advertisement by accepting a request for advertisement components from an advertisement, and in response transmit the components to an advertisement.

In one embodiment, a method or system may access a series of rules, the rules associated with a message to be presented to a remote viewer; and based on the rules, transmit a set of components of the message, wherein the components are used by the message to produce a display for a viewer. For each message, the server may record the success of the message. Each message may be for example an advertisement, or another type of message. Input to the rules may include for example information on a viewer of the message.

In one embodiment, a method or system may receive a first client a request for message components from a first client; based on the first request, select among the components a subset of components; transmit the advertisement components to the first client; receive a second client a request for message components from a second client; based on the second request, select among the components a subset of components; and transmit the components to a second client; wherein the first client is a website that redirects a viewer to the second client, and wherein which components are sent to the second client are based on which components are sent to the first client. The first client may include an advertisement into which the advertisement components are inserted. The first client may redirect a viewer to the second client, and the first client may provide an indication of components to the second client for the second client to request.

In one embodiment, a method or system may receive a request from a remote advertisement for components; based on the output of a set of rules, select at the server a combination of advertisement components, the input to the rules comprising information related to one or more factors selected from the group consisting of: information on the product which is the subject of the advertisement; the date; and the season; transmit the advertisement components to the remote advertisement; at the remote advertisement, display an advertisement comprising the combination of advertisement components. The method or system may, on a viewer indication, redirect a viewer from the advertisement to a web page; receive a request for components from the web page; and at the server, serve components to the landing page based on the combination of components served to the advertisement.

BRIEF DESCRIPTION OF THE DRAWINGS

The present invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

The processes presented herein are not inherently related to any particular computer or other apparatus, or to a specific network. While the Internet is discussed herein as being a network allowing various components to communicate, additional or other networks may be used. Various general-purpose systems may be used with programs in accordance with the teachings herein, or it may prove convenient to construct a more specialized apparatus to perform embodiments of a method according to embodiments of the present invention. Embodiments of a structure for a variety of these systems appear from the description herein. In addition, embodiments of the present invention are not described with reference to any particular programming language. It will be appreciated that a variety of programming languages may be used to implement the teachings of the invention as described herein.

Unless specifically stated otherwise, as apparent from the discussions herein, it is appreciated that throughout the specification discussions utilizing data processing or manipulation terms such as "processing", "computing", "calculating", "determining", or the like, typically refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may allow for dynamic advertisement creation and control. An advertisement server, when presenting an advertisement on a web-site, may transmit code such as a script to a viewer's computer. The code or script may be or cause the display of the advertisement, and may request pieces or components of an advertisement (which may be termed or represented as "variables") from for example an advertisement creation server. The advertisement creation server may store, for the different portions of an advertisement, different components that may be inserted in the various portions.

The pieces or components may be pre-defined or pre-set, and possibly created by a user.

A portion of a message or advertisement may be for example a section of an advertisement, where the various portions may overlap with one another. A portion be a separate and distinct section of an advertisement, such as a headline, a background, a description, and portions may overlap with and hide other portions. For example, a portion of an advertisement may a banner or headline, a background, a foreground animation, a price, a product description, a product picture, etc. However, a portion may include, for example, a general characteristic that may affect or be expressed in another component; for example a portion may be a color expressed in other visible portions. For each portion or some portions, the advertisement creation server may store multiple elements or components. For example, multiple headlines, multiple backgrounds, and multiple product pictures may be stored.

In one embodiment, an advertisement containing a script or other executable code, for example being executed on a website being viewed by a viewer, may request advertisement components from an advertisement creation server, and when receiving the components may combine the components into a completed advertisement and display the advertisement to an end viewer.

Embodiments of the present invention may allow for advertisements to be selected by or changed by an automatic process, based on for example a set of rules. For example, a rule may select one variable, piece or component over another component, or one combination of multiple components over other combinations or permutations, based on inputs or other data. For example, such inputs may include the weather, the time, date, or season, the location or identity (if known) of the intended viewer, a status of or information on the product or service being offered or which is the subject of the message (such as stock remaining, number of units sold, a rate of sale, in which regions or cities units are being sold, or other product information), or other data. For example, based on the selections of the advertisement creation server, a viewer viewing an advertisement on a website may view "Less than 10 items now in stock" if the input to a rule indicates that less than 10 items are now in stock. A viewer viewing an advertisement may view "Gear Up for the Summer Season" if the input to a rule indicates that the month is April or May.

Embodiments of the present invention may allow for messages or advertisements to be changed quickly and easily by an advertiser or user, in addition to or separate from a set of rules. For example, a user may alter, change, swap, or replace elements or components while an advertising campaign is running, and thus while components are being selected for advertisements. Thus in some embodiments a user may easily and quickly alter an advertisement or advertising campaign by altering or replacing one, some, or all components of an advertisement. Advertisements need not be static. In some embodiments the use of a compiler, or the cooperation of a professional advertisement creation service, may not be needed, speeding and simplifying the process of creating or changing an advertisement.

While messages served to viewers herein are discussed as advertisements, other forms of messages, announcements, or information to be sent to viewers may be created and transmitted in accordance with the methods and systems discussed herein.

Embodiments of the present invention may allow for feedback from advertisements to be automatically collected, and for different combinations of advertising components to be automatically tested.

For example, in one embodiment, an automatic process may create different advertisements containing combinations of components, send these advertisements to an advertisement server when advertisements are requested, and record the success of each specific combination of components. Success of an advertisement may be defined as, for example, rate or percentage of impressions resulting in click-throughs, rate or percentage of impressions resulting in conversions or purchases, or other suitable measures. The various combination or permutations may be, for example, every permutation of the components possible. For example, if there are three different portions of an advertisement (e.g., background color, headline, and video), each with three different variables or components, there are 27 different possible combinations. Other ways of making combinations are possible: for example certain components may not be suitable for use with other components, and therefore with the previous example, a lower number of advertisements may be practically produced. Each of these advertisements or combinations may be presented to a large number of viewers, possibly randomly, and the results for each tracked. The positive effect or result of each component, of certain sub-combinations of components, or entire advertisements, may be tracked.

System Architecture According to One Embodiment

Figure 1:
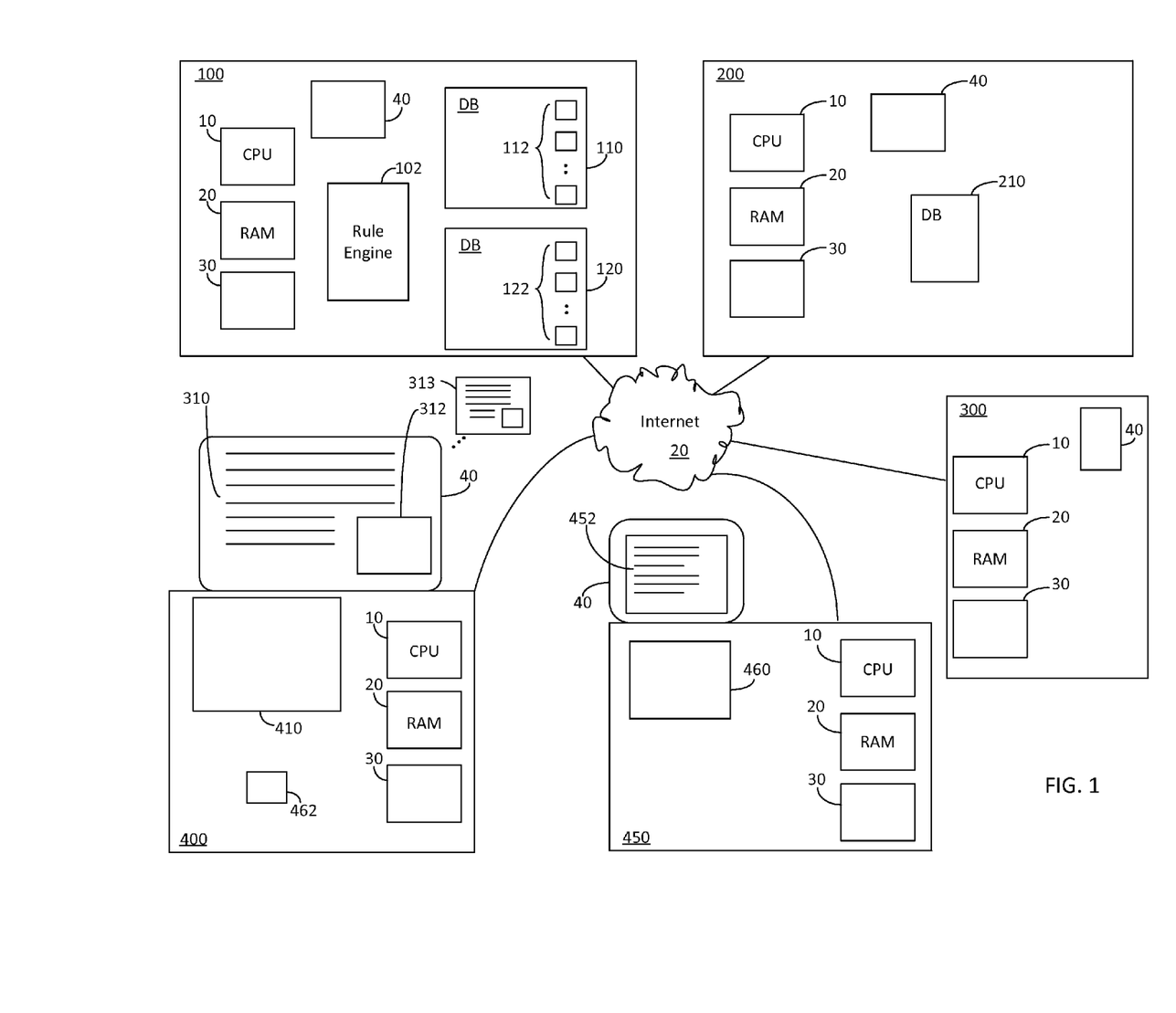
FIG. 1 depicts a system according to one embodiment of the invention.

FIG. 1 depicts a system according to one embodiment of the invention. System 1 may include advertisement creation server 100, for creating and providing advertisement or message or announcement characteristics, variables elements, pieces, or components 122, advertisement server 200, for managing and placing advertisements, typically in cooperation with a content provider web server 300, which may provide content such as a website, Internet publication, blog, or other content, a viewer terminal 400, which may allow an end-viewer to view a website or content including advertisements and a user terminal 450, which may for example allow a user such as an advertiser to create and manage advertisements.

Viewer terminal 400 may include user information 412, such as a "cookie" or other data structure, storing information on a viewer. User information 412 may be structured so it communicates only with for example server 100, and may include, for example a user identification which cannot uniquely identify the actual viewer, such as a hashed identifier string. User information 412 may identify the viewer to the server 100 or other servers, so that server 100 can identify the viewer, possibly in an "anonymous" manner. In one embodiment, no "personal" information on a user is stored at server 100. In some embodiments, advertisements or messages may be tailored based on information utterly unrelated to the viewer, such as the time, the season, the weather, information specific to a product (e.g., how many products in stock), or other information.

Servers 100, 200 and 300 and terminals 400 and 450 may communicate via one or more networks, such as for example the Internet 20. While only one each of servers 100, 200 and 300 and terminals 400 and 450 is depicted, servers 100, 200 and 300 may serve multiple viewer or user terminals (not shown), and advertisement creation server 100 may serve multiple other entities (not shown). For example, advertisement creation server may, at the same time, distribute advertisement components for multiple advertisement campaigns, each campaign simultaneously providing numerous advertisements to different viewers.

Each of advertisement creation server 100, advertisement server 200, web server 300, and terminals 400 and 450 may include standard components such as for example one or more controllers or processors 10 (e.g., a controller, central processing unit, microcontroller, other device, or combination of devices), memories 20, long-term storage units 30 (e.g., hard disk drives, removable memories such as "disk-on-key" units, or other units), and monitors 40. Each processor 10, memory 20, storage unit 30 and monitor 40 may differ when implemented within servers 100, 200, 300 and terminals 400 and 450. The various components may have vastly different scales: servers 100, 200 and 300 may comprise numerous different computers or mainframes, across one or more sites, and viewer terminal may be, for example, a personal computer (PC), workstation, personal digital assistant (PDA), cellular telephone, or other personal computing device. Advertisement creation server 100 may include a rule processor or rule engine 102, which may execute rules to determine which advertisement components to place in an advertisement, and which for example may be or include a software package or code that is executed on processor 10 of server 100, or which may be a separate physical processor from processor 10 of server 100.

In some embodiments rules are used to perform certain functions such as distributing multiple permutations of advertisements and determining which components to transmit. In other embodiments rules need not be used.

Each of advertisement creation server 100, advertisement server 200, web server 300, and terminals 400 and 450 may include components such as databases, input-output modules, and network interfaces. For example advertisement server 200 may include database 210 including for example advertisements, customer information, and billing information. Advertisement creation server 100 may include for example rules database 110, including one or more sets of rules 112 (each advertisement may have a different associated set of rules) for deciding which variables or advertisement components 122 should be placed in messages or advertisements, messages, announcements, or other viewer information, and advertisement component database 120, for storing components 122 for advertisements. Databases may be stored for example in memories 20, long-term storage units 30, or other units. Other databases may be used. While in one embodiment each advertisement is associated with or uses a particular or unique set of rules, in other embodiments a rule may be associated with or used by more than one advertisement.

Viewer terminal 400 may allow a viewer to view for example a website 310 using a viewing program 410 such as a web browser. The website 310 may be provided by the web server 300. For example, web server 300 may, via known methods, generate a blog, an online version of a newspaper, or other content, and provide the content to viewer terminal 400 to be displayed on viewing program 410. Website 310 may display messages such as advertisement 312 (when used herein, the visual display and code causing the visual display of advertisement 312 may both be referred to by reference numeral 312).

User terminal 450 may allow a user such as an advertiser, an advertisement agency, or a business to create and manage advertisements, rules related to advertisements, or advertisement campaigns, for example using a viewing program 460 such as a web browser, displaying a website 452 provided by server 100. The website 452 may be provided for example via advertisement creation server 100. For example, advertisement creation server 100 may, via known methods, generate a user interface to be presented via website 452 on user terminal 450. The user interface on website 452 may allow a user to interface with data structures and software on advertisement creation server 100 or other entities to create advertisement components 122, manage and create rules assembling the components 122 into advertisements, and perform other functions such as testing, etc.

In one embodiment the entity that controls the serving of advertisements to web-pages viewed by viewers, e.g., advertisement server 200, is physically and commercially separate from the entity that provides components to fill advertisements, e.g. advertisement creation server 100, and both such servers are physically remote from the advertisement (including code) which is executed by a viewer terminal and which receives components and uses them to present an advertisement to a viewer. However, in other embodiments such functions may be combined in one server.

System Functions According to One Embodiment

Web server 300 may call on advertisement server 200 to present advertisements within the website 310 provided on the viewer terminal. Advertisement server 200 may for example manage an advertising campaign, sell advertisement space to third parties on websites such as those generated by web server 300, and provide advertisements to websites. Advertisement server 200 may insert advertisements such as advertisement 312 in website 310. In one embodiment an advertisement 312 may include executable code such as a script in the Actionscript™ language, or another language or combination of languages, which when executed may assemble and present an advertisement using components 122 provided by advertisement creation server 100.

Typically, the various servers are physically and commercially distinct. However, the physical divisions and divisions in functionality between the various servers and entities discussed herein are provided as examples only, and other arrangements of functions are encompassed by the invention. For example, an advertisement server separate from an advertisement server need not be used. Furthermore, while "advertisement server" and "advertisement creation server" are used herein, messages may be created and managed by servers not termed "advertisement" servers. While business conventions commonly have an advertisement server separate from a web server, the functionality of both may be different than described herein, and may be combined. A website 310 may not function separately from advertisement 312 but rather may be one unit, in accordance with some embodiments of the invention.

Possibly in response to a request, advertisement server 200 may transmit an advertisement 312 to the code for website 310 being executed on viewer terminal 400.

Advertisement 312 may include executable code, such as a script in the Actionscript™ language, or another language or combination of languages, which is sent to the web page operating on or being executed by viewing program 460 (e.g., a web browser). In one embodiment, advertisement 312 may include code or script in a layer that controls communication between the advertisement 312 and the advertisement creation server 100, and which in addition controls other layers or objects in the advertisement 312, to request, accept, and display advertisement components within the advertisement.

Advertisement 312, when executed, may produce a visual advertisement within the visual display produced by website 310. Website 310 and advertisement 312 may produce one unified visual impression, such as that of a newspaper with an advertisement, in accordance with known methods. When discussed herein, advertisement 312 executing a function indicates that the code or script producing the visual and audio impression is executing a function.

Clicking on advertisement 312 may cause the viewing program 410 to be redirected to another Internet website, such as a destination page or a landing page 313, which is displayed on monitor 40. In some embodiments, landing page 313 may include code and functionality allowing it to display components or variables in a manner similar to that of the advertisement 312.

Advertisement 312 may request advertising variables or components 122 from for example advertisement creation server 100, or from another entity. This request, and other advertisement 312 functionality, may for example arise when code or a script in advertisement 312 is executed on a viewer terminal 400. Advertisement creation server 100, using methods discussed herein, may provide one or more advertisement components 122 to advertisement 312. Advertisement 312 may assemble the components 122 and may present an advertisement within website 310, to the viewer. While typically a number of components may be requested, in some embodiments only one component may be selected. Furthermore, components 122 may be integrated with graphical, audio, or other advertisement portions stored permanently within an advertisement 312 (e.g., only some portions of an advertisement may be provided by server 100).

In one embodiment, advertisement 312 itself is not complete until a server presents it with variables or components. E.g., advertisement 312 may be considered to be a program or script which is to create a visual advertisement after receiving variables or components to display, and possibly including default components.

Advertisement 312 may function as a traditional Internet based advertisement. For example, a viewer may click on or otherwise interact with advertisement 312 on order to respond to an offer, and may be redirected to another website such as for example landing page 313. Advertisement 312 may communicate with advertisement server 200 or advertisement creation server 100, for example transmitting viewer feedback, or reporting on viewer actions (e.g., click-throughs, purchases, etc.). An advertisement may include default or placeholder components, to be displayed if no components are received, or successfully received, for certain portions, and also may display certain components without consulting with an advertisement creation server.

After a viewer clicks or otherwise indicates on a message or advertisement, the user may be redirected to another Internet website, such as a destination page or a landing page. In some embodiments, the landing page may include code and functionality allowing it to display components or variables in a manner similar to that of the advertisement. Further, the specific variables that were displayed on the advertisement may themselves be displayed on the landing page, or may have analogues or partner components displayed on the landing page.

For example, a viewer may view an advertisement tailored according to the season and including a headline noting "20 percent reduction on hats." The viewer may click on the advertisement and be redirected to a landing page which similarly notes "20 percent reduction on hats." The landing page may have or may be operated by the execution of code similar to that described herein with respect to advertisements or messages which may request from a server components; thus when used herein a landing page may be a message. The advertisement may pass information to the landing page indicating which variables were served to the advertisement: for example, a set of variable or component identifications, or for example an advertisement identification. The landing page may request from a server, such as advertisement creation server 100, the specific components indicated by the advertisement, or may for example pass an advertisement identification to the server.

The server may serve to the landing page the variables or components sent to the advertisements, or, alternately, analogues. Analogues of components or variables may be other components or variables with content that is different but complimentary to the components or variables. For example, component 222 may include "Pool party Saturday" in a format suited to a banner advertisement, and analogue component 222' may include "Pool party Saturday" in a format suited to a particular landing page.

Which variables or components are sent to the landing page may be based on which components were sent to the message or advertisement. The server may identify the components to be sent to the landing page by, for example, an advertisement identification, or identification of specific components, possibly in combination with a lookup in a database at the server. The advertisement, when it redirects a viewer to the landing page, may provide an indication of components to request.

The landing page may include code or script as described above with respect to messages or advertisements.

User Creation Of and Alteration Of Advertisements

A user wishing to create and place advertisements may create advertisements. The user, using for example a user terminal 450, may communicate with advertisement creation server 100 to create or modify advertisement components 122 or rules 112, using known graphic, video, and audio creation tools.

For example, a user may define (using, for example, the user interface on website 452) an advertisement and define a number of advertisement sections or portions (e.g., title, offer detail text, background design, product graphic, background music, animation element with audio). For each section or portion, the user may create one or more graphic, text, audio, or video advertisement components 122, and map the component to a portion. In one embodiment, an advertisement component 122 may be assigned to one portion of an advertisement; in alternate embodiments, a component may be assigned to more than one portion. The user interface provide by server 100 may allow, for example, editing of advertisements and viewing (e.g., preview) of advertisements as collections of selected advertisement components.

In one embodiment, one or more of the following data items are associated with an advertisement component 122 on server 100 (e.g., in component database 120): a component identifier, a component name (e.g., a human readable label), the section or portion of the advertisement it is relevant to (e.g., a mapping to a portion or to an advertisement), which advertisement it is relevant to (e.g., an advertisement ID, or an advertisement campaign ID), content (e.g., jpg, color choice, HTML code creating a banner, audio, etc.), and its "type" (e.g., audio, text, graphic, background color). Other data items may be associated with or define an advertisement or message component.

The user may use the user interface on website 452 to define one or more rules 112. Rules 112 may be formulated in, for example, C++ in combination with PHP and SQL, but other languages or combinations or languages may be used. Rules 112 may be stored for example in rules database 110.

A user may also insert into an advertisement other elements such as a destination to go to if a user clicks on a certain element, and static elements that are not changed by selection of components by advertisement creation server 100. Such static elements may be stored in the code or script defining an advertisement 312, rather than being stored in and provided by server 100.

The finalized advertisement may include a script or code, such as Actionscript™ or other suitable languages, and possibly data such as links, graphics, audio or video data addresses, etc.

A user may, using for example a user terminal 450 and the user interface on website 452, alter advertisement components 122 and/or rules 112. In some embodiments, this may be done easily and dynamically. For example, a user may, while an advertisement campaign is ongoing (e.g., while advertisement creation server 100 is distributing advertisement components to form advertisements) alter rules or advertisement components, effectively altering the ultimate advertisements that are seen by viewers, with possibly immediate effect, without, for example using a professional designer, a compiler, or another complex tool. Such alterations may be performed by, for example, creating or altering components or rules, and swapping the rules or components with existing rules or components. Other methods of altering advertisements may be used.

Rule Based Decisions For Advertisement Components

Rules 112 may for example, based on input to the rule or not, determine the choice of one or more advertisement components. For example, a rule 112 may determine the choice of a headline or announcement component from among a number of different components based on a random choice, based on the last component chosen for a certain portion, or other "non-external" information. Such information may be stored in the rule, for example to force a scroll through all such components assigned to a particular advertisement portion, or may be stored elsewhere in server 100. A rule 112 may determine the choice of a price announcement component from among a number of different such components for a price portion based on for example input from a supplier or advertiser of the number of items left in stock, based on the predicted temperature for a region, based on the season or date, or other external information. Such external information may be stored in the rule or elsewhere in server 100. Such external information may be obtained at the time that the rule is executed by for example a rule engine or processor 102, or may be stored within for example memory of server 100, or may be updated periodically, or may be gathered by other methods. For example, when a rule deciding which product description to use based on the weather is executed, the weather may be queried from, for example, an Internet website. As another non-limiting example, when a rule is executed which decides which language to use based on, for example, a customer identification or a customer geographic location, such information may have been sent to server 100 by the advertisement, or the advertisement may be queried.

One rule 112 may affect the choice of components for multiple sections or portions of an advertisement.

Non-limiting examples of input to rules resulting in rule decisions or components being served are, for example: impression/view (e.g., how many times a viewer has seen a particular advertisement); click (e.g., whether or not a viewer has clicked-through previously); page view; conversion/action having taken place; season, day of week, date or time; time zone of the viewer; language (e.g., from a browser setting).

Rules 112 may be stored for example in rules database 110 and executed by for example processor 10 and/or rule processor or rule engine 102 in advertisement creation server 100. Each of rules 112 may for example, determine the choice of one or more advertisement components.

In one embodiment, a user may create a rule using an interface. The user may, for example, select the input or type of data the user wants to act upon. Based on the data type, the appropriate logical operators may appear. For example if the data type is "Impression," the operators may include <, >, between, and in the range of. The user then may choose the component or variable or sets of components or variables to display when that condition is met.

Rules can be stacked or ordered; for example a first rule can determine which other rules will be executed. In one embodiment, there must be a default rule that applies if none of the previous conditions are met; however, other embodiments need not include this feature. Rules may apply to groups of views, e.g., apply to specific users, identified for example by cookies. The views may be anonymous, in that, for example, the real identity of the viewer cannot be determined from the identification information provided to the server. Rules may apply across all viewers, e.g., without regard to the identity of the viewer.

Examples of two rules appear below. In other embodiments, rules may take other forms.

The following example rule may perform sequenced messaging based on the actions of groups of viewers. In the following rules variables (e.g., advertisement components) are sent (e.g., served) to advertisements. The following rule may be applied to each unique viewer, for example identified by a cookie or other identifier. The first line may be a question answered by the creator of a rule, determining if the rule operates only on unique viewers or is to operate on all viewers; other methods of implementing such functionality may be used.

Apply message sequencing to each unique cookie: YES
1—IF Site=examplesiteone.com AND Placement=homepage THEN
2—IF landing page view=1 AND action=0 THEN SERVE variables 999,111,222
3—IF click>=1 THEN SERVE variables 090,878,656//send components 090,878,656 to advertisement
4—IF impression<3 AND click=0 THEN SERVE variables 121,345,567
5—IF impression>=3 AND click=0 AND last impression<30 days THEN SERVE variables 987,654,321
6—ELSE serve variables 333,444,555

The following example rule may sequence messaging based on the date, applying to all groups of viewers, e.g., apply to each viewer regardless of identity.

Apply message sequencing to each unique cookie: NO
1—IF today's date is between Jun. 15, 2007 and Jun. 27, 2007 THEN SERVE variables=777,111,222
2—IF today's date is Jun. 28, 2007 THEN SERVE variables 777,111,223
3—IF today's date is Jun. 29, 2007 THEN SERVE variables 777,111,224
4—ELSE serve variables 777,111,225

Other formats for rules may be used.

Testing and Advertisement Feedback

In some embodiments, a message or advertisement may provide feedback, user information, or other information to for example advertisement creation server 100 or advertisement server 200. In some embodiments, an advertisement creation server, possibly using rules or a rules engine, may create a broad sample of advertisements for distribution. Such "test" advertisements may, for example provide feedback for use in automatic or user-controlled adjustment or alterations of advertisements. As with other features discussed herein, feedback and testing may or may not be used in the same embodiment.

In one embodiment, advertisement creation server 100, possibly using rule engine or processor 102, may create a set of different advertisements containing combinations of components. These sets of components may be created as requested by advertisements. Server 100 may store which permutations or combinations have been used, so that the "next" in a sequence, or different combinations, may be served for each sequential advertisement request. Other methods of ensuring different advertisements are sent may be used; for example the combinations may be random.

For example, if there are N different sections or portions of an advertisement, each with M different components, there are M^N (M to the power of N) different possible combinations. If certain components can only be used with other components, or cannot be used with certain components, less than M^N combinations may be created. Each time an advertisement queries server 100 for a set of advertisement components, the server may create a different set of components and serve them to the advertisement. Since, in a typical advertisement campaign or test, many more than M^N viewers will have advertisements loaded to their terminals and cause advertisement requests, the M^N combinations are likely to repeat across different viewers.

In one embodiment, a process may ask questions to the user (e.g., in a wizard format) to for example reduce the total number of combinations to be tested in order to reach a valid result. For example, if an advertisement has 4 sections with 3 variables/versions/components each, a full factorial test includes 81 combinations which are generated and then shown to viewers. A large sample size (e.g., expressed in number of impressions) is needed to test that number of combinations.

A user may be asked if one component or variable, or the components or variables in one portion or section, influences or interacts with another, or the components or variables in another section. By asking the user about the interaction between components or variables, a process, using for example known statistical methods may generate a fractional factorial test by for example reducing the total number of combinations required to obtain a valid test result. Testing may be more efficient for the user by for example reducing the number of impressions required, and saving the user from wasting media budgets on unnecessary test combinations. Users may be given the option to override such a process and for example force a full factorial test during the test setup process.

For example, in the case of two portions, price and incentive, each with two variables or possibilities, the following combinations among others may occur:
Price=$19.99 and Incentive=none
Price=$24.99 and Incentive=free duffle bag It is likely that these two portions have an interaction. Interactions may occur for example if the effect of one element is dependent on another element. For example, in this case, the effect that a higher price may have on the performance of a banner is likely to be dependent on whether or not there's an incentive present. The effect a price increase has on the click-through rate may vary depending on how good the incentive is. In the above example, if there is an interaction, all four combinations may be tested. If not, less combinations may be tested.

If such interactions are likely to occur, special testing considerations may be established to ensure the test results will be reliable and predictive. A process may detect possible interactions, and then query the user as to whether they agree with those possible interactions. The answers to those questions determine how many combinations are required to create a valid test. In one embodiment, the more interactions there are, the more combinations should be tested. If no elements are likely to interact with each other, a process may the system can automatically scale the test down to fewer combinations (e.g., using a fractional factorial test).

The combinations may be created, for example, by rules, which may store for each of the N portions which was the last component used, and which may cycle through all possible combinations, or which may randomly generate combinations. Information on which combinations have been used, where in a combination "cycle" the rule is, or other information, may be stored in the rule(s), or elsewhere on advertisement creation server 100. While in some embodiments rules are used to effect functionality (e.g., distributing multiple permutations of advertisements; determining which components to serve) in other embodiments rules need not be used.

Other ways of making combinations are possible: for example certain components may not be suitable for use with other components, and therefore with the previous example, a lower number of advertisements may be practically produced.

Each of these advertisements or combinations may be presented to a large number of viewers, possibly randomly, and the results for each tracked.

Advertisements, or another entity, may report or deliver feedback to a server such as advertisement creation server 100. Such capability may, for example be embedded in the script or code that is included within an advertisement. For example, the script or code in an advertisement may be executed on a viewer terminal 400, which may cause the viewer terminal 400 to report, for example, if there was a click-through, if there was a sale, or if the viewer interacted with the advertisement. Such feedback may be saved for example at advertisement creation server 100.

In one embodiment, a process may interact with a user to minimize wasteful presentation of advertisement, such as, during a testing process, serving unnecessary impressions or serving combinations that have been identified as an underperformer.

In one embodiment, advertisement creation server 100 may automatically alter an advertisement campaign based on an automatically run test. A test may determine the best set (wherein set may include one or more) of combinations of advertisement components or variables, best possibly being defined by those that result in the most click-throughs, or conversions, or purchases, or by another criteria. After a set period of time, server 100 may exit a "test" mode, and serve advertisements to viewers based only on the best set, or the top "X", combinations of components.

The time limit may for example be set by a user. For example, the user may define a period, e.g. a 24-hour time period, where a test is to run. During the 24-hour test time period any advertisement requesting components gets, e.g., a random or cycled set of components. After the 24-hour test time period any advertisement receives only the best combination of components, or one combination selected from among the best set of components. Alternately, before the pre-set time period is over, if server 100 determines that one or more combinations of components are clearly superior to others, the test period may end before a user-set period has ended. Other methods of setting a time period or providing a bound for a test period may be used.

Defining a test period with an end time (which may be variable based on results) may limit the number of advertisements served, and thus result in a more efficient campaign, reducing the serving of combinations of variables resulting in less successful advertisements. A minimum number of test samples may be used.

A process may analyze test data at the end of a period or at the end of a series of periods (e.g., every 24 hours) to determine if there is a statistically significant result, e.g., a measurement or a difference between the results of certain combinations of components. A user may establish a level of significance that on which to base the analysis (such as 95%, 90%, etc).

An advertiser may have the test automatically stopped once a statistically significant result is found. "Stopping" a test, may mean that once statistical significance is found, the only version or versions that will continue to be shown is the one that has the best performance metric. A performance metric may be defined by the advertiser, for example click-through rate or conversion rate. Variable combinations known to be less effective will cease to be shown to viewers. In one embodiment, at this point, the advertiser may decide what to do: for example, continue to let the winning version run or start another test or some other action.

A user may choose to stop a test based on a date, time, time elapsed, or other time-based criteria. For example, in the case that an advertiser has an offer running for a limited time, and wants to know results prior to that date, the advertiser can select the end date, and when that date is reached, a process may analyze the results so far, and automatically show only the best performing version.

A user may choose to stop a test based on a quantity of events, such as number of impressions, a number of clicks, etc. A user may choose to stop a test based on the number of impressions (e.g., views) or clicks (e.g., actions). When that number or level has been counted, the server may determine the best performing version and automatically show only that version.

Such rules can be "stacked" in any order. For example, the advertiser can specify:

First look for statistical significance; if that is found, stop the test

Then look for end date; if that is found, stop the test

Then look for maximum impressions allowed; if that is found, stop the test

Other stackings or combinations of rules may be used. A notification system may in one embodiment alert users by for example e-mail about the status of the tests.

Flowcharts of Some Embodiments

Figure 2:
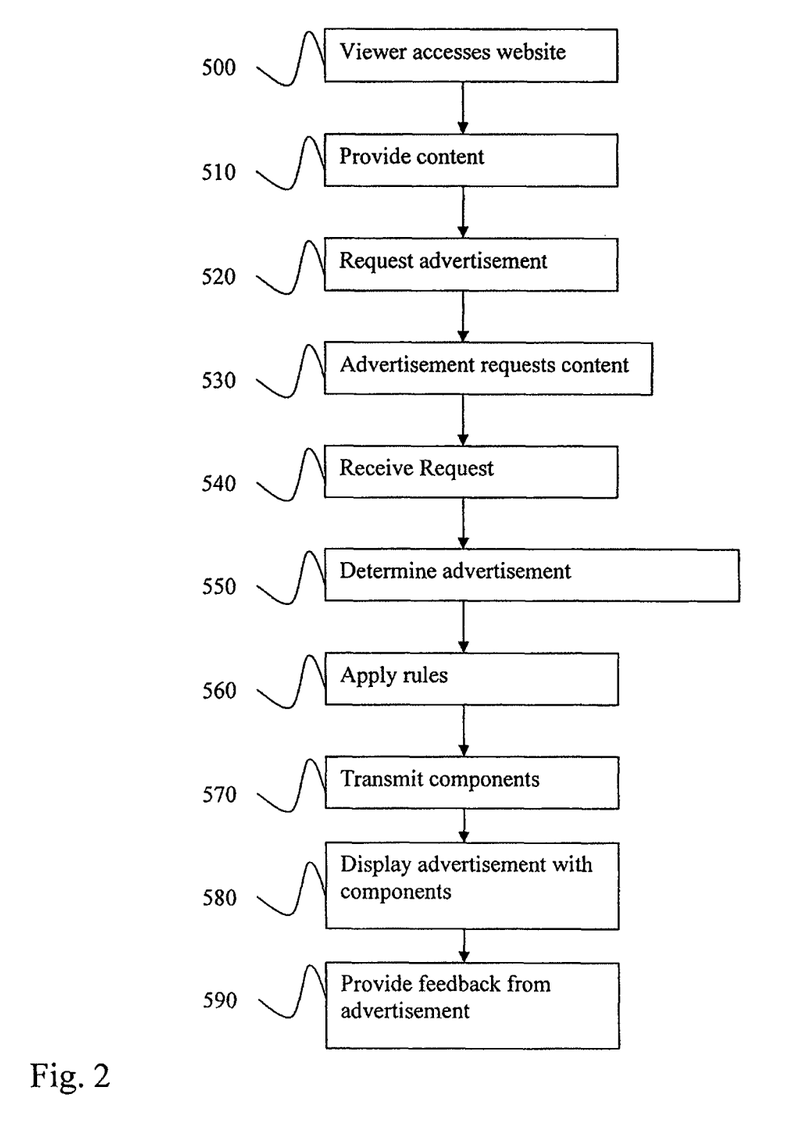
FIG. 2 is a flowchart describing a method according to one embodiment of the present invention.

FIG. 2 is a flowchart describing a method according to one embodiment of the present invention. The operations in FIG. 2 may be performed, for example, by the components discussed above, but may be performed by other devices and systems, having other structures.

In operation 500, a viewer may access a website using, for example, a browser on a terminal such as a personal computer. The website may be provided by a web server. The browser may request content such as graphics, code (e.g., a script), and other content from the server. In operation 510 the web server may provide the content to the viewer's computer.

The content may include a section for advertisements (e.g., banner advertisements), messages, announcements, or other viewer information and in operation 520 the code operating the web site, on the viewer's terminal, may request such messages or advertisements from, for example, and advertisement server. The advertisement server may provide content such as graphics, code (e.g., a script), and other content which, when executed and displayed by the viewer's terminal creates a visual and/or audio and/or video advertisement shown on the viewer's computer.

In operation 530, the message such as an advertisement, which may be considered a client, may request content from a server such as an advertisement creation server. Such requested content may include, for example, advertisement components.

In operation 540, the message such as an advertisement creation server may receive the request. The request may be for example a standard HTTP request. In alternate embodiments an advertisement ID and possibly authentication information may be sent. The request may include viewer identification information or geographic identification information. Such information may be provided, for example, by a viewer terminal's Internet protocol address, by information stored in a cookie on a viewer's terminal, by information communicated from the viewer to the advertisement, or via other methods.

In operation 550, a server such as the advertisement creation server may determine, based on the request, which message, advertisement or advertising campaign is requesting the advertisement components. The server may determine which rules are relevant to the advertisement based, for example, on an advertisement identification. Rules need not be used to determine which variables or components to send.

In operation 560, a server such as the advertisement creation server, for example using a rules engine or rules processor, may apply rules relevant to the message or advertisement and select certain advertisement components to include in the advertisement based on the rules. The rules may require input such as data stored in a database at the server (e.g., the date, the number of times a certain component has been used) or data that may have to be queried from another entity. Certain rules may decide which of other rules to apply.

Information about the viewer, such as a viewer identification or account number, a viewer geographic location, a viewer's past history (e.g., purchase history provided by a cookie or for example provided by a second server such as an advertisement server) may be a parameter input to a rule.

In operation 570, the advertisement creation server may transmit the advertisement components to the advertisement.

In some embodiments, the advertisement and the components of the advertisement may be provided by the same server, or other operations that are described as being performed by separate units may be performed by the same server.

In operation 580, the advertisement may use the transmitted components, possibly in combination with internal data, to create and display an advertisement on the website. In one embodiment, the advertisement components are inserted in the relevant portions within the advertisement, or "plugged in", and displayed to the viewer within the website displaying the advertisement. For example, the advertisement may include code or a script that may when executed cause the display of graphics and text, and possibly audio and video, where some of the items displayed are the components transmitted from a remote server. The advertisement itself may assemble a complete visual and/or audio/video presentation to the viewer, based on variables or components received from a server and possibly based on default information contained within the advertisement. In one embodiment, the advertisement itself is not complete until a server presents it with variables or components.

An advertisement may include default or placeholder components, to be displayed if no components are received, or successfully received, for certain portions. Each component may be labeled with a position or portion information, or information allowing the advertisement to determine a portion.

In operation 590, in some embodiments, the advertisement may provide feedback to for example the advertisement server or advertisement creation server, such as for example if the user clicked on the advertisement or purchased a product based on the advertisement. In other embodiments, the advertisement may collect data from a user directly, without redirection to an advertiser's website, and this data may be reported as feedback.

Other operations or series of operations may be used.

Figure 3:
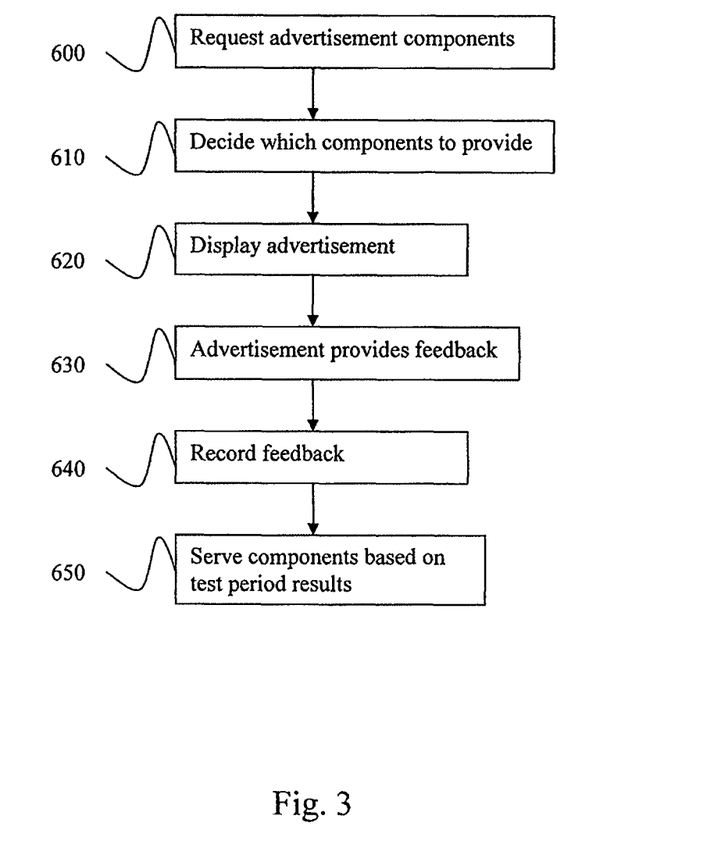
FIG. 3 is a flowchart describing a method according to one embodiment of the present invention.

FIG. 3 is a flowchart describing a method according to one embodiment of the present invention. The operations in FIG. 3 may be performed, for example, by the components discussed above, but may be performed by other devices and systems, having other structures.

In operation 600, a message such as an advertisement (e.g., a banner advertisement) may request from a server such as an advertisement creation server a set of variables such as advertisement components. The message may be considered a client.

In operation 610, the server may decide which variables or components such as advertisement components should be provided. In one embodiment, the server may scroll through all possible (or desirable) combinations of advertisement components, and each additional request from an advertisement may result in a decision to provide the "next" set of components. Information on the last set of components delivered may be stored. It may be desirable to ensure that, among a large number of advertisements requesting components for a particular advertising campaign, the different combinations of components are evenly distributed. In other embodiments, the server may provide the components randomly. Other methods of providing the components may be used.

In operation 620, the message or advertisement may be displayed, for example on a viewer terminal.

In operation 630, the advertisement may provide information or feedback to the server.

In operation 640, the feedback or information may be recorded by the server, for example in a database.

In operation 650, the results of the test may be used to produce an advertisement campaign. For example, after a testing period, an advertising campaign period may begin, where the most successful or best combination(s) of variables may be served to advertisements.

Other operations or series of operations may be used.

Figure 4:
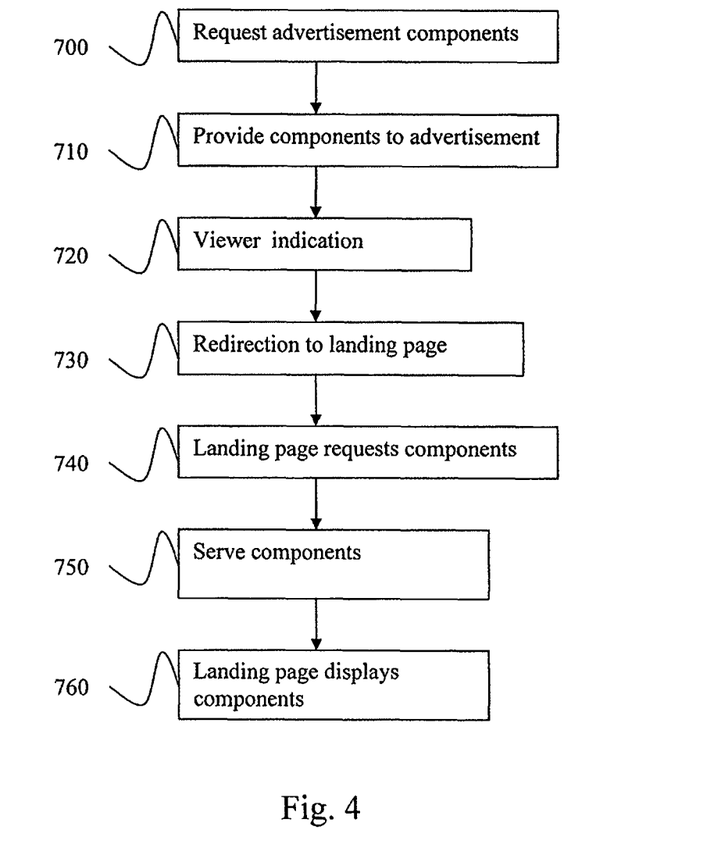
FIG. 4 is a flowchart describing a method according to one embodiment of the present invention.

FIG. 4 is a flowchart describing a method according to one embodiment of the present invention.

In operation 700, a message such as an advertisement may request from a server such as an advertisement creation server a set of variables such as advertisement components.

In operation 710, the server may provide the components to the advertisement.

In operation 720, a viewer may indicate (e.g., by clicking using a pointing device such as a mouse, or by using a keyboard) that the viewer should be redirected to a landing page. For example the viewer clicks on an advertisement requesting that the viewer's web page display the landing page associated with the advertisement.

In operation 730, the viewer's terminal or internet browser may be redirected to the landing page.

In operation 740, the landing page may request components, such as advertisement components, from a server.

In operation 750, the server may serve variables or components to the landing page. For example, advertisement components that are equivalent to or analogues of those served in operation 710 may be provided to the landing page. Different numbers of components may be provided in operation 750 as compared with operation 710.

In operation 760, the landing page, possibly using structures, code, or methods similar to those used by the advertisement, may display the components to the viewer.

Other operations or series of operations may be used.

In some embodiments, the code or script that is included within an advertisement may execute to perform functions such as, for example, interacting with a viewer. For example, when advertisement code is executed by a viewer terminal, the advertisement may allow a viewer to enter viewer information, such as identification information (e.g., a name, an e-mail address, etc.), product request information, or other information. In some embodiments, the advertisement may respond to the viewer without consulting or requesting information from a separate server, and without redirection to a separate website. The advertisement server may report information to, for example, the advertiser, the advertisement server, the advertisement creation server, or another entity.

In some embodiments, if the same viewer accesses or views the same advertisement, each viewing will result in a different set of advertisement components, and thus a different advertisement. A viewer may be identified, as discussed, by for example a cookie or other data item stored on a viewer terminal, or another identification.

A viewer may be shown an initial message that will be displayed at the time of the first impression (or first few impressions), and a new message may be displayed on following impressions, possibly only if the viewer indicates (e.g., clicks), but does not convert. Such functionality may be provided for example by rules taking input and serving components, rather than for example by whole compiled advertisements or static and unchangeable advertisements or messages being sent.

The code or script operating an advertisement may periodically, or in response to an event, update the advertisement display by, for example requesting updated information from a server such as server 100.

It will be appreciated by persons skilled in the art that the present invention is not limited to what has been particularly shown and described hereinabove. Rather the scope of the present invention is defined only by the claims, which follow:

The invention claimed is:

1. A method comprising:
   storing at a first server a plurality of advertisement components;
   receiving a client a request for advertisement components, the client being a computer of a viewer of an advertisement, the client request generated by executable code in the advertisement for assembling the advertisement components into the advertisement;
   based on the request, selecting at the server among the plurality of advertisement components a subset of advertisement components, the subset of advertisement components comprising at least two advertisement components; and
   transmitting the subset of advertisement components to the client for assembly into the advertisement, the executable code, assembling, at the client, the subset of advertisement components into the advertisement for display to the viewer.

2. The method of claim 1, comprising:
   on a viewer indication, redirecting the viewer from the advertisement to a landing page;
   receiving a request for advertisement components from the landing page; and
   at the server, serving advertisement components to the landing page.

3. The method of claim 1, wherein the selecting is performed according to a set of rules.

4. The method of claim 1, wherein the selecting is performed according to a set of rules, the rules accepting as input information unrelated to a viewer.

5. The method of claim 1, comprising receiving from an advertiser a request to change an advertisement component.

6. The method of claim 1, wherein the advertisement comprises sections, and wherein for each section a plurality of components can be selected to comprise the section.

7. The method of claim 1, wherein the second server provides advertisement code to a computer of a viewer of the advertisement, the advertisement code assembling an advertisement.

8. The new method of claim 1, comprising receiving, from the client, a request to insert the advertisement within a web page.

9. The new method of claim 1, comprising sending, by one of the first server and a second server, the advertisement comprising the executable code to the client for the execution at the client.

10. A system comprising:
    a client, the client comprising a computer of a viewer of an advertisement;
    a first server;
    a storage unit at a first server storing a plurality of advertisement components;
    the first server to:
    receive a client a request for advertisement components, the client request generated by executable code in advertisement for assembling the advertisement components into the advertisement ;
    based on the request, select among the plurality of advertisement components a subset of advertisement components, the subset of advertisement components comprising at least two advertisement components; and
    transmit the subset of advertisement components to the client, the executable code to assemble the subset of advertisement components into the advertisement for display to the viewer.

11. The system of claim 10, wherein the advertisement comprises sections, and wherein for each section a plurality of components can be selected to comprise the section.

12. The system of claim 10, wherein the server is to:
    create a plurality of advertisements from combinations of the advertisement components; and
    record the success rate of each of the advertisements.

13. The system of claim 10, wherein the first server receives from the client a request to insert the advertisement with in a web page.

14. The system of claim 10, wherein the first server sends the advertisement comprising the executable code to the client for execution at the client.

* * * * *